United States Patent [19]

Strömberg

[11] Patent Number: 5,689,671
[45] Date of Patent: Nov. 18, 1997

[54] SYSTEM FOR REDUCING QUANTITY OF DATA TRANSMITTED TO A USER UNIT BY TRANSMITTING ONLY AN IDENTIFIER WHICH POINTS TO PRE-STORED INFORMATION IN THE USER UNIT

[75] Inventor: Fredrik Strömberg, Bromma, Sweden

[73] Assignee: ICL Systems AB, Kista, Sweden

[21] Appl. No.: 764,229

[22] Filed: Dec. 13, 1996

Related U.S. Application Data

[63] Continuation of Ser. No. 244,394, filed as PCT/SE92/00825, Nov. 27, 1992 published as WO93/11494, Jun. 10, 1993, abandoned.

[30] Foreign Application Priority Data

Nov. 27, 1991 [SE] Sweden .................................. 9103513

[51] Int. Cl.$^6$ ...................................................... G06F 13/00
[52] U.S. Cl. ................... 395/385; 395/200.01; 395/500; 395/825; 395/758
[58] Field of Search ................................ 395/500, 758, 395/200.01, 385, 825

[56] References Cited

U.S. PATENT DOCUMENTS

| | | | |
|---|---|---|---|
| 3,919,484 | 11/1975 | Maxemchuk | 370/79 |
| 4,365,315 | 12/1982 | Jamnik | 395/758 |
| 4,484,304 | 11/1984 | Anderson | 364/900 |
| 4,503,499 | 3/1985 | Mason et al. | 364/222.2 |
| 4,949,302 | 8/1990 | Arnold et al. | 395/375 |
| 5,025,395 | 6/1991 | Nose et al. | 395/154 |
| 5,257,185 | 10/1993 | Farley et al. | 364/419.19 |
| 5,301,270 | 4/1994 | Steinberg et al. | 395/161 |
| 5,303,343 | 4/1994 | Ohya et al. | 395/500 |
| 5,307,265 | 4/1994 | Winans | 364/419.01 |

FOREIGN PATENT DOCUMENTS

| | | |
|---|---|---|
| 0 121 071 | 10/1984 | European Pat. Off. . |
| 0 333 612 | 9/1989 | European Pat. Off. . |
| WO 93/11494 | 11/1990 | WIPO . |

Primary Examiner—Thomas C. Lee
Assistant Examiner—Po C. Huang
Attorney, Agent, or Firm—Lee, Mann, Smith, McWilliams, Sweeney & Ohlson

[57] ABSTRACT

The present invention relates to a method and to a computer system arrangement for producing a dialogue between a central computer unit and at least one user unit. The user unit includes at least one display means and a memory means and can be connected to the central computer unit. The central computer unit includes a central memory means in which there is stored a software part, called the dialogue part, which is intended for data processing requested by the user unit. Information concerning the text and/or picture for presentation on the display means is pre-stored in the user unit memory means and separate user units may be of different types. The information transmitted from the central computer unit to the user unit during a dialogue session includes at least one first identifier which corresponds to a message to be transmitted, wherein the first identifier points out a presentation object which corresponds to the message in the user unit memory means. The presentation object presents the message in different forms, according to the type of user unit concerned.

11 Claims, 4 Drawing Sheets

SYSTEM FOR REDUCING QUANTITY OF DATA TRANSMITTED TO A USER UNIT BY TRANSMITTING ONLY AN IDENTIFIER WHICH POINTS TO PRE-STORED INFORMATION IN THE USER UNIT

This application is a continuation of application Ser. No. 244,394, filed as PCT/SE92/00825, Nov. 27, 1992 published as WO93/11494, Jun. 10, 1993, now abandoned.

The present invention relates to a computer system arrangement for reducing the amount of information that need be transmitted between at least two separately stored parts of an application.

DEFINITIONS

The following is a list of expressions used in the present document and their meaning:

| | |
|---|---|
| centralised computer system | a computer system in which a central unit controls all other units; |
| decentralised computer system | a computer system in which the user units have the same controlling power as the central unit; |
| interpreter | a program which is able to convert one data structure to another data structure |
| terminal | a unit which has little or no processing capacity |
| user unit | a unit via which a user can have services performed, such as a terminal, personal computer or workstation, for instance. |
| central unit | a central computer unit which serves different users. |

BACKGROUND ART

In multiterminal systems, i.e. centralised computer systems which comprise a central computer and a plurality of terminals connected thereto, all information required for an application that involves cooperation between a terminal and the central unit has traditionally been transmitted through the connection between the central computer and the terminal concerned, without taking measures to reduce the quantity of information that needs to be transmitted.

In decentralized computer systems, i.e. systems in which the user units are comprised of personal computers or workstations instead of terminals, an application is not normally divided for coaction with a central unit. In those cases where division has been made, for instance in the case of data-base based applications in which data base information has been transmitted from the data base to the user unit for temporary, individual processing in the user unit, some attempts have been made to reduce the quantity of information that need be transmitted, for instance by compressing and decompressing the data quantity. However, with those applications which have been divided into several parts and these parts stored in different physical units, the problem that large quantities of information must be transmitted on the communication link between the units still remains.

One technical problem to be solved by the present invention resides in obtaining faster dialogue between a user unit and a dialogue-part where the quantity of information that need be transmitted is much smaller than what was earlier the case.

THE OBJECTS OF THE PRESENT INVENTION

The main object of the present invention is to reduce the quantity of data that need be transmitted to and from a user unit. This is particularly important when the communication system to and from the user unit is slow.

Another object of the present invention is to enable a user to obtain texts in the application presented on the screen in the mother tongue of the user, i.e. to make the computer system language-independent. For instance, if a central computer is located in a French speaking region and a German user wishes to establish a long route contact with a particular application stored in the central computer with dialogue between user and the central computer, it is probable that the German user will carry out the dialogue in German, not French or English.

A further object of the present invention is to enable different makes and types of user units to be used without needing to amend the dialogue-part of the application, i.e. without needing to make the computer system arrangement dependent on make and type. For instance, if a user unit is a simple terminal, the information/messages are presented in text form, whereas in the case of a personal computer having greater processing ability and a graphic screen the same messages are presented in text and graphic form, whereas in the case of an advanced workstation the message can be presented with high-resolution color graphic, sound and animations.

The main object of the invention is achieved with an arrangement of the kind set forth in the characterizing clause of claim 1. Further features and further developments of the inventive arrangement are set forth in the depending claims.

In the case of a computer system in which the user applications are divided into at least two parts, each of which may be stored in a respective separate computer, one serving the user interface of the application, the interface part, and a dialogue-part which handles the actual dialogue with the user, the quantity of information that need be transmitted to and from the user unit can be reduced considerably when the user unit has standardized information elements stored therein.

BRIEF DESCRIPTION OF THE DRAWINGS

So that the present invention will be more readily understood the invention will now be described with reference to exemplifying embodiments thereof and also with reference to the accompanying drawings, in which.

DESCRIPTION OF EXEMPLIFYING EMBODIMENTS

According to the present invention, an application can be divided into two physical and logical parts. For instance, the application may be a ticket booking information system, wherein, according to the invention, the user interface part handles the screen layout of the ticket booker and deals with the input data given, and wherein a dialogue-part, which may be stored centrally at a head office, handles divers calculations, check routines and data base updates. An exemplifying embodiment of one such information system included in a computer system arrangement is illustrated in FIG. 1.

The illustrated computer system arrangement includes a central unit C which can be connected to at least one other unit. The central unit C is intended to serve at least one user unit A1, . . . , An and is provided with a dialogue-part DD to this end. The dialogue-part is stored in the memory means 6 of the central unit, hereinafter called the central memory means 6. The central unit C may also include a screen C1 and a keyboard C2.

When a user starts the application, i.e. the application containing the dialogue and interface parts, part of the central memory means 6 in the central unit C can be reserved for this user for the purpose of executing the dialogue-part DD of the application. A possible other user is allocated another part of the central memory means 6 for executing the dialogue-part DD. It is advantageous in a multi-user system to store the dialogue-part DD as a shared resource, so that several users can execute the dialogue-part simultaneously without each requiring a complete copy.

Figure 1:
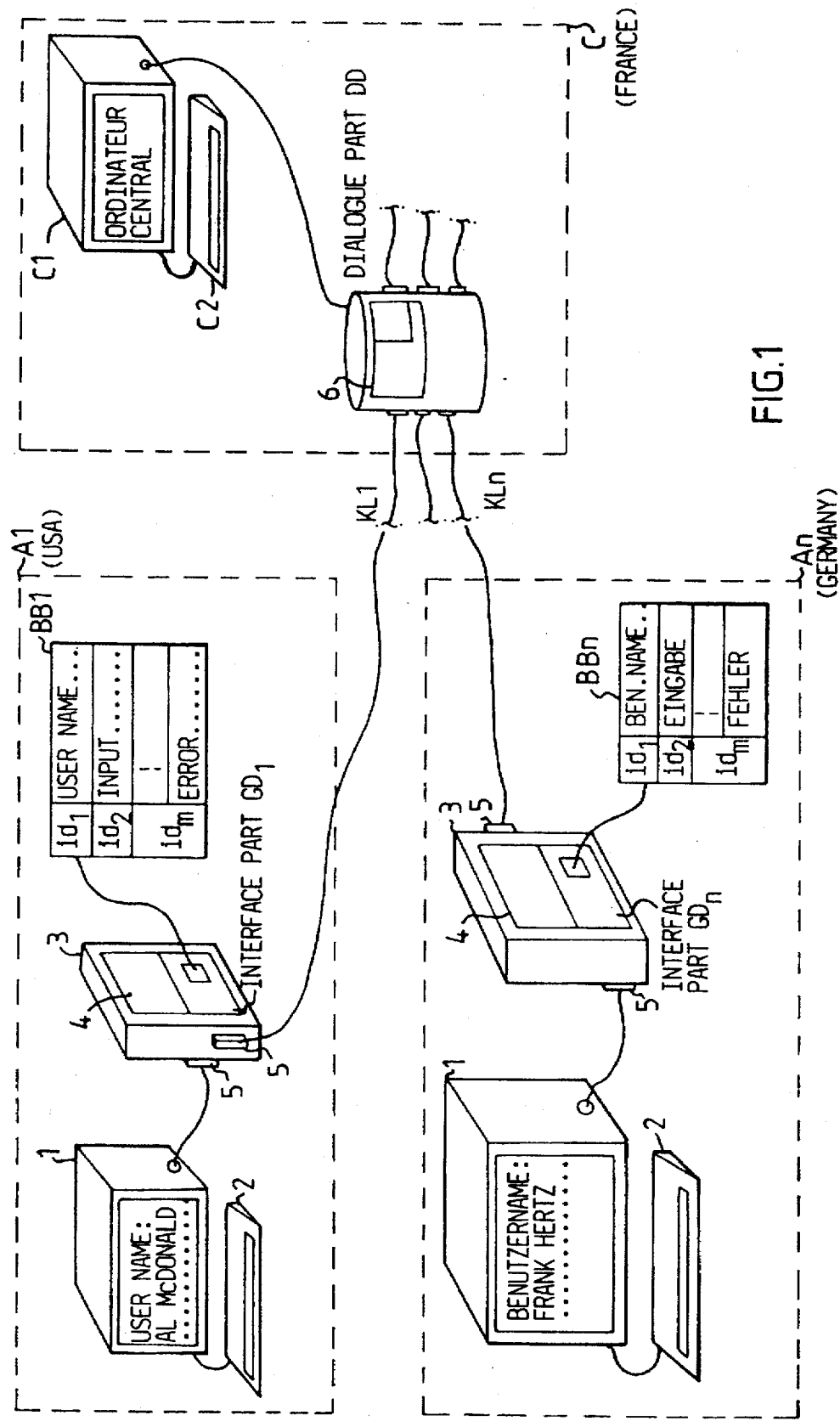
FIG. 1 is a schematic illustration of a computer system which includes a plurality of communicating units.

In the case of the embodiment illustrated in FIG. 1, the central unit C is connected to a number (n) of user units A1–An, of which two are shown. In the illustrated embodiment each user unit includes conventionally a display means 1 consisting of a screen 1, a keyboard 2 and a memory unit 3, which in accordance with the present invention has an interface part GD1 and GDn respectively which operate as picture interpreters having a picture directory BB1 and BBn respectively. The memory unit 3 includes a memory means 4 that contains application software therefor and also has memory areas for the storage of picture elements for presentation on the screen 1. It also includes communication hardware and communication outlets 5 for communication with the central unit C.

The illustrated user units may be located geographically in different places in the world. For instance, the user unit A1 may be located geographically in the USA and user unit An in Germany. The central unit C may be located in France.

In accordance with the invention, each user application is divided into a first part, which is physical and programmed in the user unit of the user, and a second part which is physical and programmed in the central unit C.

When transmitting information and messages between different user units, a presentation order may be included. The presentation order may instruct the user unit to present given information on the display means 1. The presentation order may also include at least one so-called identifier. An identifier is used to point-out objects in the memory of the user unit or in the memory of the central unit. An object may consist of a presentation object or an information object that contains certain information. This will be described in more detail below. Since the computer system may include user units that are located in several different countries and/or users which use different human languages (mother tongues) when using the user units, an identifier is highly beneficial when communicating between the units. This also implies a considerable reduction in the quantity of information that need be transmitted, since only one or two identifiers are transmitted between the units instead of needing to transmit a large number of questions and answers.

According to one exemplifying embodiment of the invention, the computer system arrangement is used for booking air tickets. This embodiment is illustrated i FIG. 1. A central unit C is located in a central which deals with all flight bookings within an airline company, and the users of the system are travel agents of several different nationalities. When a large number of complete question-and-answer alternatives are stored in different language versions, the administrator for instance at the central unit can choose to ask the user at the user unit A1 for supplementary information concerning a given flight booking. The administrator chooses question 2 on his French menu and a corresponding presentation order is transmitted and a picture of question 2 appears on the screen of the user unit A1 in the English language. The user at A1 chooses, for instance, answer alternative 5 on his English reply menu, and a corresponding response is sent back to the central unit on the presentation order. This response may include an identifier which informs the central unit as to which reply alternative the user A1 has chosen. For instance, the identifier may point-out in the memory of the central unit a given object that includes the information in the reply alternative 5.

The Interface Part

The part that is placed with the user is called the user interface part GDi, where i is a numerical value between 1 and n, or more briefly the interface part, and handles the user interface, i.e. that part of the application seen by the user, such as menus, error messages, etc. The memory means 4 of the user unit may be of different types, depending on the make and the type of the user unit A1, An, which may, for instance, be a personal computer or a workstation. It should be noted that the user units A1,An may be of mutually different makes and/or types.

The memory areas containing picture elements in the interface part GD1 and GDn respectively are disposed in the memory means 4 as one or more directories BB1 and BBn respectively. Among other things, the picture directory may include the soft copies that the user shall be permitted to see on the screen 1 of the user unit. These soft copies are often very finely composed graphically in high resolution graphic and may therefore occupy a relatively large space in the memory. An important advantage afforded by the inventive arrangement is that these soft copies need not be transmitted between the different units included in the arrangement every time they are to be shown to a user, but may be stored in the user in the interface part GDi in the user unit Ai, where i is a numerical value between 1 and n.

The picture directory and picture interpreter and their component parts will be described in more detail below. It should be noted, however, that each picture directory may have picture texts in a language which suits the user, meaning that the text presented to the user may be in the user's mother tongue. In the case of the FIG. 1 embodiment, the picture directory BD1 contains English language text, whereas the picture directory BBn includes German language text.

Figure 4:
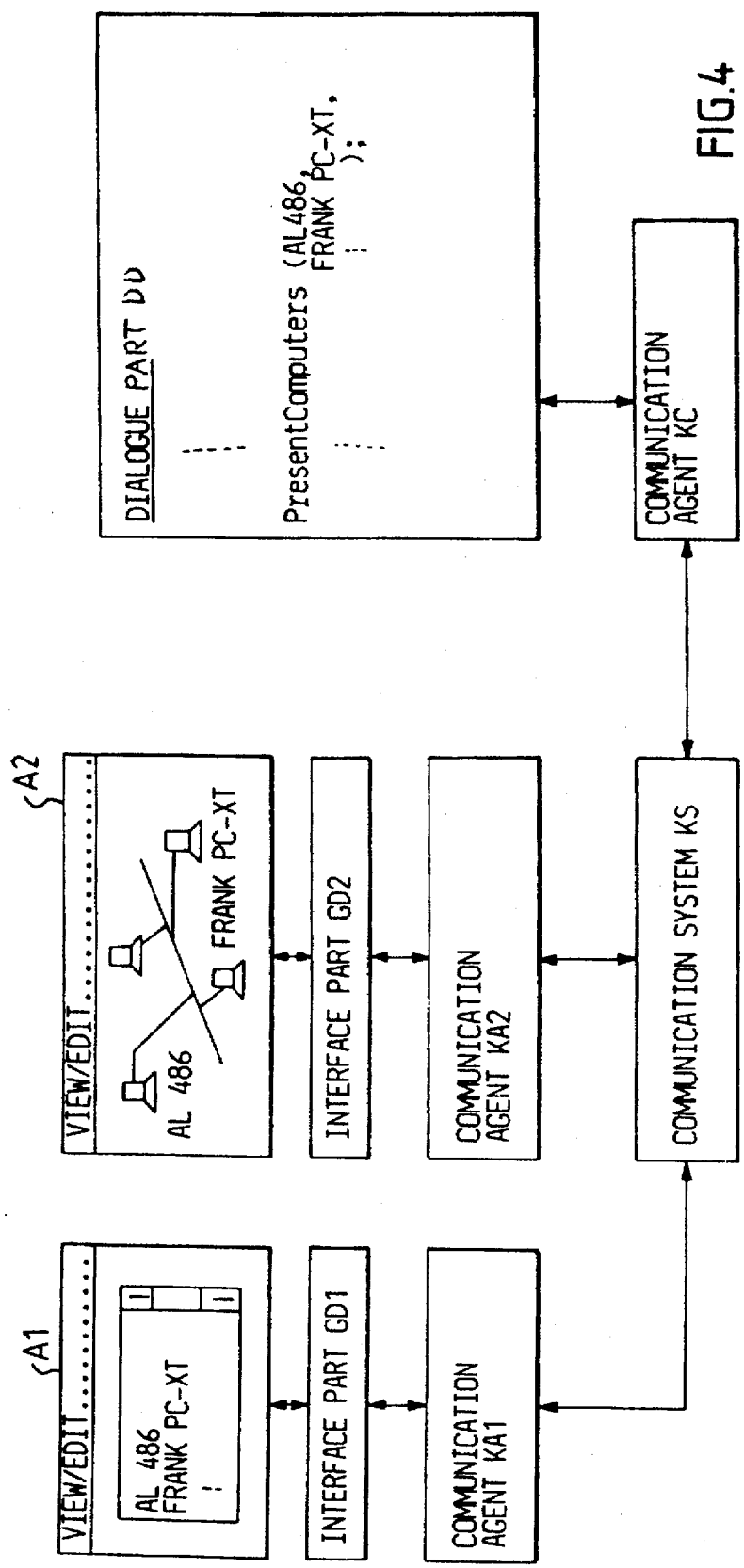
FIG. 4 is a block schematic illustrating a computer system arrangement where the same information is presented to the users in different forms.

It should also be noted that several picture directories may be provided for presenting the same information (see FIG. 4). For instance, the system may include picture directories intended for text-oriented screens, these directories containing a number of presentation objects which present information with the aid of text. The system may also include picture directories intended for workstations provided with screens which are able to manage high-resolution graphic, sound, etc., wherein a directory may include presentation objects which present information with the aid of graphic, animations, sound etc. A specific message from the central unit to a user unit may be corresponded by a specific presentation object of the user unit.

Dialogue Part

The second part is called the dialogue part DD and is the actual application, i.e. it includes everything with the exception of the user interface part. The dialogue DD may include a facility for carrying out different kinds of calculations, data base searches, processing information, etc. The dialogue part DD of an application may be stored in a central memory means 6 in the central unit C. The central memory means 6 may be one of several different kinds, depending on the make and the type of central unit concerned, which, for instance, may be a VAX 750 from Digital Equipment, an IBM 390 large computer, a SUN workstation, a personal computer, etc.

Classification of User Authorities

The dialogue part DD may have a large capacity and include more data than will be presented on the screen 1 of the user unit via the interface part GDi of the application. Thus, when classifying user authorizations it is not necessary to make changes in the dialogue part DD, but only in the interface part GDi. Presentation objects/soft copies which, in desired classifications, include different part-quantities of all the picture elements which are included in the presentation object "maximally expanded" on a given occasion are added to the interface part GDi.

The communication links or communication networks KL1, ... KLn, which connect respective user units A1 and An to the central unit C may be of different kinds, for instance telelines, LAN-networks (Local Area Network), WAN-networks (Wide Area Network), etc. The arrows on the links indicate that data is sent in both directions.

When the dialogue part DD requires input data from the user, a dialogue session is created and an identifier $id_1$ is sent to the user unit A1, where it is received by the interface part GD1. Thus, it can be said that the dialogue part DD drives the interface part GD1. Expressed in another way it can be said that the dialogue part DD is a customer and the interface part GD1 performs a service on behalf of the client, i.e. the dialogue part and the interface part have a customer/server relationship. The identifier $id_1$ is used by the interface part GD1 to look-up in its picture directory BB1 the presentation object which the identifier $id_1$ represents, in this case: "User name: ... ". That is to say the $id_1$ of the screen reference is able to point-out a physical address in the user-unit memory means 4, the presentation object being stored at this address. The picture interpreter shows the presentation object stored at this address as a soft copy. The soft copy asks the user to give some type of information, for instance his name, and the answer to the question is typed-in on the keyboard 2.

The picture interpreter interprets those operations performed by the user. A user is often required to choose between given alternatives. According to the invention, the choice can be converted to an order, which represents the choice and which is transmitted from the interface part GD1 to the dialogue part DD. The order may include data given by the user in the form of a reply to a question on the screen 1, and it may also include an identifier. The identifier included in the order may point-out in the memory means 6 of the central unit an information object which corresponds to the aforesaid choice. Thus, only user dependent information and identifiers are transmitted on the communication link KL between the two units concerned.

Language independency is achieved by using a plurality of directories locally, preferably one directory for each language. All that is necessary to change the language in which the dialogue with the user is conducted is to change the actual directory itself, which is a local operation in the user unit A—the central unit C is not touched.

A description of the inventive computer system arrangement will now be described in more detail with reference to FIG. 2. On the right of FIG. 2 there is shown a central unit C which may be similar to or the same as the central unit C in FIG. 1. The dialogue part DD, which is contained in a broken line box, includes a "virtual" application EA and dialogue sessions DS. By virtual application EA is meant that part of the application which carries out the actual calculating and processing operations, whereas the dialogue sessions DS handle the exchange of information with the user.

Figure 2:
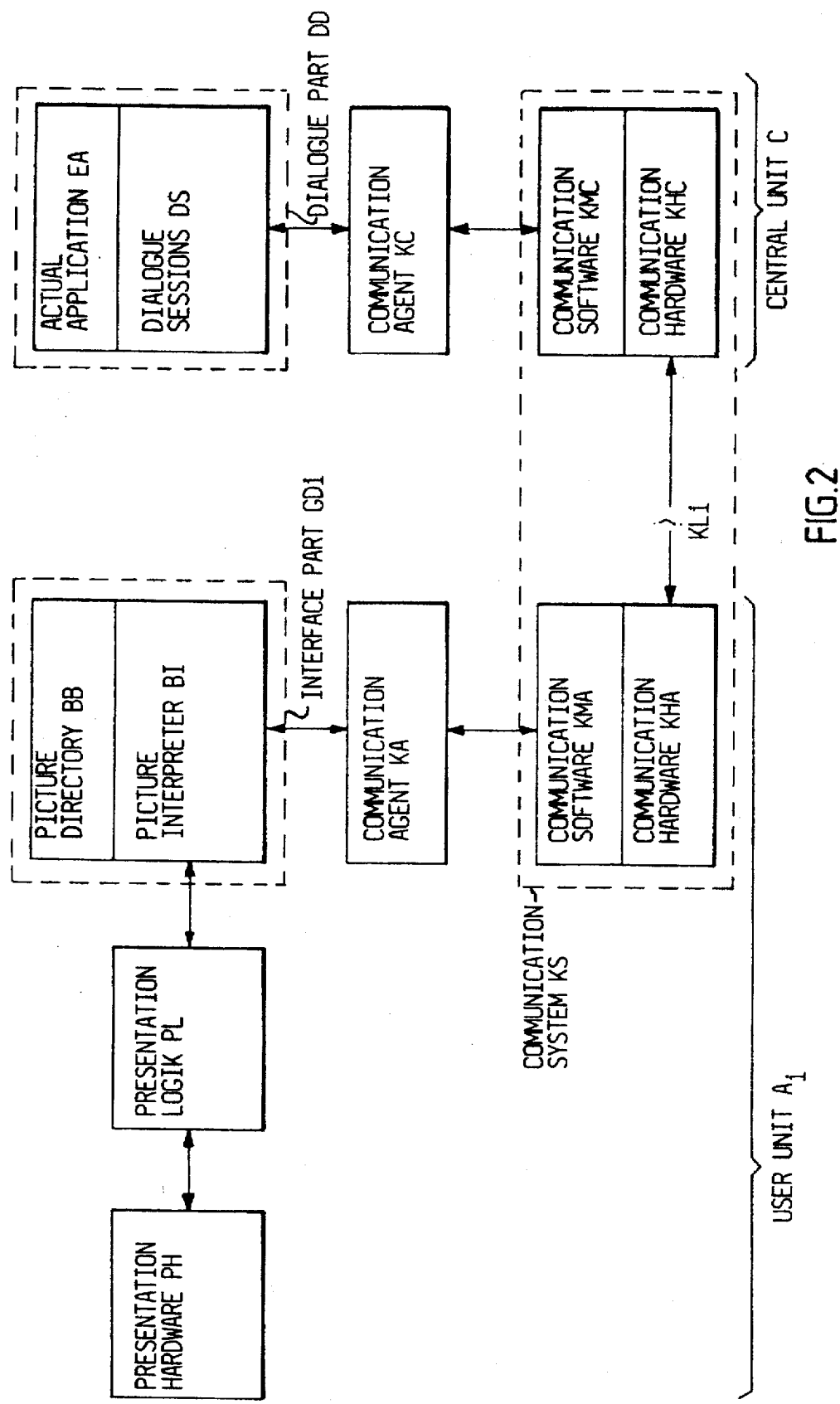
FIG. 2 is a block schematic illustrating an inventive computer system arrangement from the aspect of communication.

In the case of the embodiment illustrated in FIG. 2, an exchange of data is first carried out between the dialogue session DS and a communication agent KC. The agent KC can be considered as an interface which converts data to a format which is suitable for transmission to the user unit Ai concerned, via a communication system KS. The communication system KS includes communication software KMC and communication hardware KHC on the central unit side, a communication link or a communication network KL and communication hardware KHA and communication software KMA on the user side.

Data is received by the communication hardware and the communication software KHA, KMA of the user unit A, and is converted by a communication agent KA to a format which is suitable for the interface part GDi and is sent to this interface part. The interface part GDi includes a picture interpreter BI and one or more picture directories BB. The picture interpreter BI communicates with a presentation logic PL, which may, for instance, have the form of an OS/2 PresentationManager, windows 3, HP NewWave, Macintosh Toolbox, etc, for presenting therethrough said logic pictures on a presentation hardware PH, such as a Nokia Alfaskop, Sun Workstation, MacIntosh, AST 386SX/20, etc. The presentation hardware PH and the presentation logic PL are thus commersially available and well known devices.

The communication agents KA, KC translate protocol queries to local calls and vice versa. The communication agent KA maintains the communication contact with the communication agent KC:

The elements illustrated in FIG. 2, with the exception of presentation hardware and presentation logic, can be fitted into the OSI-model (Open Systems Interconnection). The OSI-model describes a model of a data communication architecture and also functions as a starting point for different communication standards. In this regard, the communication system KS can be said to relate to the six lowest layers of the seven layers given by the OSI-model, i.e. physical layer, link layer, network layer, transport layer, session layer and presentation layer. For each layer, the distribution between hardware KHA, KHC and software KMA, KMC arranged to provide the functionality given by the OSI-model, may be different for different communication system designs. It is not necessary to realize all of these layers, or all of the parts of said layers, in a communication system KS according to the OSI-model. The communication agents KA, KC are said to concern the lower part of the application layer. The parts contained in broken line boxes, i.e. the dialogue part DD and the interface part GDi, belong to the application layer. With regard to the OSI-model and its different layers, reference is made to the book "Data and computer communications", William STallings, Macmillan Publishing Company, 1988, pp 375-399. Since the present invention is not concerned with the type of communication system KS used, it will not be described in more detail here.

Picture Directory

As mentioned in the aforegoing, the interface part GDi of the total application includes one or more directories:

a) Soft copy panel and menu directory, wherein each panel and each meny may include:
   the current static soft copy (text, layout)
   the procedures that can be carried out (menus, keys),
   picture frames with lists of objects that can be selected,
   what shall be transmitted to the communication agent KA when the user has chosen an object or a procedure,
   associations to related help texts,
b) Help text directory
   The interface part GDi may also include:
c) A panel-, menu- and command interpreter, i.e. the picture interpreter BI which interprets the information given by the user via selection or as input data from some input device, such as a keyboard for instance, and which sends the input data given to the communication agent KA. The interpreter also interprets help panels and/or help menus.

A Dialogue Session

Figure 3:
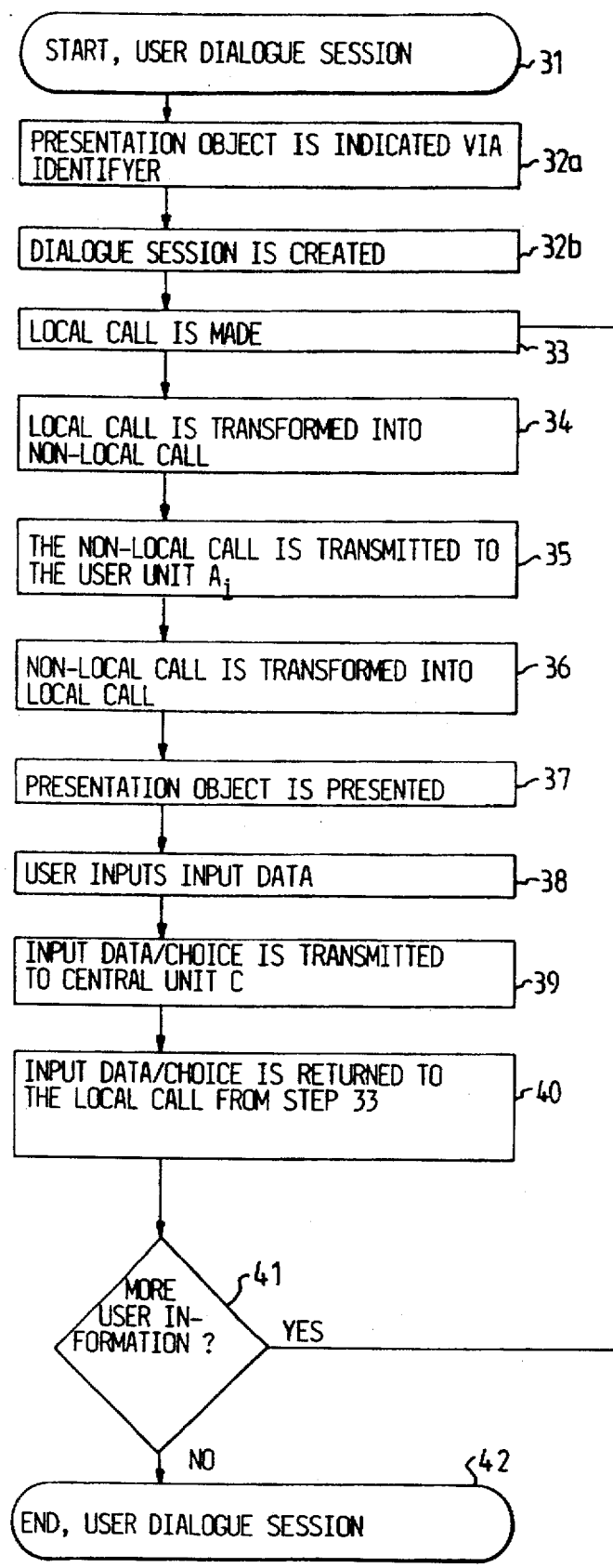
FIG. 3 is a flow sheet of dialogue between two units in a computer system arrangement of the kind illustrated in FIG. 2.

FIG. 3 is a flow sheet which illustrates a dialogue session DS between two units in a computer system arrangement of the kind illustrated in FIGS. 1 and 2. A method which handles a dialogue session between a user unit A and a central unit C will now be described with reference to the flow sheet shown in FIG. 3.

The following is an example of a dialogue session DS in a C-like program language:

```
{
create dialogue;
infoVector→put ( ... ),
dialogue.transmit (UserView1, infoVector);
dialogue.receive(... switch ... );
delete dialogue
}
``` wherein the dialogue is created (create dialogue;), information is entered (infoVector→. . . ) and a local call is made (dialogue transmit . . . ) with an identifier (UserView1) which represents the presentation object to be shown. Input data/selection stated by the user is received (dialogue receive . . . ) and the dialogue terminated (delete dialogue).

Step 31 in the flow sheet of FIG. 3 represents the stage at which the user dialogue is initiated from the actual application EA, which in step 32a, through the medium of an identifier, discloses the text and/or picture information, hereinafter referred to as the presentation object to be shown on the user unit A and the input data that is required. A dialogue session DS for handling the communication with the user is created in step 32b.

In step 33 a local call is made from the dialogue session DS for the purpose of showing the presentation object pointed-out by the identifier. A local call is made because the actual application EA and the dialogue sessions DS created thereby are configured irrespective of how and where user communication is achieved, since this is the function of the interface part GDi. The actual application EA merely states what is desired, i.e. which information/presentation object shall be shown and which input data is required. An important advantage with this arrangement is that presentation of picture information on the user unit can be achieved completely independently of the dialogue part DD, i.e. the interface part GDi may be different for different user units. Each interface part GDi can use the fundamental presentation hardware to an optimum. For instance, a simple terminal of low processing capacity, can present presentation objects in the form of text, whereas a personal computer of greater processing ability and having a graphic screen is able to present the same presentation objects in the form of text and graphics, whereas an advanced workstation is able to produce presentation objects as a picture with high-resolution color graphics, sound illustration and animations, i.e. with the aid of multimedia technology.

The local call is converted in step 34 to a non-local call on the communication agent KC. In step 35, the communication system KS handles the physical transmission of the non-local call, which includes the identifier of the presentation object. The non-local call is converted by the communication agent KA to a local call in step 36. The local call passes to the picture interpreter BI, which looks-up corresponding presentation objects in the picture directory BB, with the aid of the accompanying identifier. In step 37, the corresponding soft copy is shown as a result of the picture interpreter BI calling the presentation logic PL, which presents the picture and its picture elements on the presentation hardware PH, which may be a personal computer for instance. Thus, the presentation object may be presented in different ways, depending on the type of user unit concerned.

In step 38, the user states a selection or some other input data, for instance through the medium of a keyboard 2 or a pointer (mouse), to the presentation hardware PH, which reaches the picture interpreter BI via the presentation logic PL. In step 39, the picture interpreter BI returns an answer, i.e. the user input data and/or selection, to the original local call. The answer is handled by the communication agent KA, where the answer is converted and transmitted from the user unit A to the central unit C, via the communication system KS. The answer may be transmitted from the user unit to the central unit C in the form of identifier references to ready-mode reply alternatives. In step 40, the answer is sent to the communication agent KC, where it is converted to a format which coincides with the format given by the dialogue session DS.

The original local call made in step 33 can be considered as being a function call which produces an answer when the function has been executed, the answer in this case being the input data and/or selection given by the user. If more information needs to be exchanged between the user and the actual application EA, which may be due to the input data/selection stated by the user, the method step 33 can be repeated via step 41, i.e. with a new local call. If the exchange of information with the user is finalized in step 41, the user dialogue session is then terminated via the NO-branch.

Only identifiers of panels and menus and requisite data are transmitted from the central unit C to the user unit A, not the static texts. This technique reduces the quantity of data that need be transmitted and also enables different languages to be used in the panels and the menus at the central unit C, i.e. the central system, in comparison with the user units, i.e. the local systems. It is also possible to use different languages in one and the same system.

The same technique can be used when input data and/or selection shall be transmitted from the user unit A to the central unit C.

An identifier can point-out a presentation object which includes a pre-defined program operation or a lay-out of operation instructions. An operation instruction lay-out that has been pointed-out can then present a selected soft copy. For instance, a presentation order transmitted from the central unit may include an identifier which implies that given information shall be presented on the user unit. Depending on the type of user unit concerned, the information can be presented either in the form of a text picture in the absence of graphic or as a picture with graphic. The identifier may then point-out the pre-defined program operation which presents the given information, and the predefined program operation may decide whether or not the information shall be presented as a text picture in the absence of graphic pictures or as a picture with graphic.

FIG. 4 shows schematically an arrangement in which a call "PresentComputors" in a dialogue part DD which causes a picture to be presented on the user units concerned (A1 and A2 in FIG. 4) through the medium of the communication agents KC, KA1, KA2 and the communication system KS. FIG. 4 illustrates that the same information can be shown in different views on different user units. The call in the dialogue part DD may function to show those computer which are found in a given part of the system, wherein the dialogue part DD solely specifies what is to be shown, and not how it shall be shown. The user unit A1 shows a list of computers and the user unit A2 shows a graphically constructed picture of the computers.

The present invention is particularly advantageous when the actual presentation is effected graphically, i.e. with the use of icons, and the fundamental communication system KS is slow, which is often the case in long route communication, via tele lines for instance.

I claim:

1. A method for obtaining simplified dialogue between a central computer unit and at least one user unit of a plurality of user units in a computer system arrangement, wherein the user units each include a display means and a memory means and can be connected to the central computer unit, wherein the user units are of different types, and wherein the central computer unit includes a central memory means in which there is stored a software part, referred to as a dialogue part, intended for data processing requested by a said user unit, wherein information relating to text and/or pictures, depending on the user unit type and depending on a chosen type of information display, for presentation on the respective display means is prestored in the memory means of each user unit; wherein the prestored information is different for the different user unit types, wherein the information transmitted in a dialogue session from the central computer unit to a said user unit includes an identifier which corresponds to a particular message to be transmitted and which identifier is the same for all user units to which that particular message is to be sent irrespective of their type and the chosen type of information display, wherein the identifier points out, in the said user unit's memory means, a respective presentation object which corresponds to the message, and wherein the respective presentation object presents the message on the said user unit's display means in the respective manner for the said user unit, characterised in that a first local call including the identifier is made in the central computer unit, the purpose of said call being to cause the message to be presented on a display means;

in that the first local call is converted to a non-local call in the central computer unit;

in that the non-local call is converted to a second local call by a said user unit;

in that a picture interpreter in the said user unit identifies a corresponding presentation object in the said user unit's memory means by means of the identifier included in the second local call;

in that the presentation object may include a pre-defined program operation which presents the message either as a picture which consists solely of text or as a picture which includes both text and graphics, or as a message which includes a graphic picture and sound illustration, in accordance with the type of user unit concerned;

in that the picture is presented on a display means belonging to the said user unit;

in that a user of the said user unit gives one or more reply data;

in that reply data is transmitted from the said user unit to the central computer unit, which receives this data;

and in that the central computer converts reply data to a format which can be interpreted as a reply to the first local call.

2. A method according to claim 1, characterised in that a plurality of presentation objects are stored in the form of a picture directory in each user unit memory means, each presentation object being addressable by a respective identifier.

3. A method according to claim 1, characterised in that the identifier that is transmitted from the central computer unit to a said user unit is given by the dialogue part of the central computer unit;

in that the identifier is interpreted in an interface part of the said user unit; and in that the interface part uses the identifier to point-out the corresponding presentation object in the said user unit's memory means and present a corresponding message on the said user unit's display means.

4. A method according to claim 1, characterised in that reply data is transmitted from the user unit to the central computer unit in the form of identifier-references to readmade reply alternatives.

5. A method according to claim 1, characterized in that the reply on the first local call initiates repetition of the method.

6. A method according to claim 1, characterised in that a further first local call is made and the method is repeated when the reply to the first local call contains a request from the central computer unit for more information from the said user unit.

7. A method according to claim 1, characterised in that the mother tongue presented as picture and/or text information on the display means belonging to a said user unit is chosen individually for each user unit.

8. A method according to claim 7, characterized in that a user of a user unit gives one or more reply data in a chosen mother language and the reply is interpreted in the central computer unit in a mother language which is independent of the chosen mother language.

9. A computer system arrangement for providing a dialogue between a central computer unit and at least one user unit of a plurality of user units, wherein the user units include a display means and a memory means and can be connected to a central computer, wherein the user units are of different types, wherein the central computer unit includes a central memory in which there is stored a software part, referred to as a dialogue part, intended for data processing requested by a said user unit, wherein information relating to text and/or pictures depending on the user unit type and depending on a chosen type of information display, for presentation on the respective display means is stored in the memory means of each user unit, wherein the prestored information is different for different user unit types, wherein a respective interface part in each user unit is intended for communication with the respective user unit memory means and the respective user unit display means and also with the central computer unit, wherein the dialogue part of the central computer unit is intended to disclose a particular message to be presented on a said user unit's display means by means of an identifier, which identifier is the same for all user units to which that particular message is to be sent irrespective of their type and the chosen type of information display, wherein the identifier is transmitted to the interface part in the said user unit and points out a presentation object, in the said user unit's memory means, that corresponds to the particular message, wherein each user unit further includes an input device by means of which a user can give input data and selection in reply to a message presented on the user unit's display means, and wherein the interface part is intended to transmit the input data and the selections given by the user to the dialogue part of the central computer unit, characterised in that a plurality of presentation objects corresponding to a plurality of messages are stored in a picture dictionary in each user unit's memory means; and in that the respective interface part further includes a respective picture interpreter which coacts with the picture dictionary and which presents the presentation object pointed-out by the dialogue part on the display means and which interprets those operations carried out by the user for retransmission to the dialogue part of the input and selections given by the user.

10. An arrangement according to claim 9, characterised in that a plurality of picture directories are stored in each user unit memory means, these picture directories each including a presentation object which has the same messages but is in different mother languages; and that the picture directory required can be selected from the user unit.

11. An arrangement according to claim 9, characterised in that a said message can be presented on a said user unit in accordance with the properties possessed by the said user unit with regard to processing capacity, graphics and sound; and in that a specific message corresponds to a single presentation object at each individual user unit.

* * * * *